H. F. KRANTZ.
ELECTRICAL SWITCH.
APPLICATION FILED DEC. 2, 1913.
1,275,047.
Patented Aug. 6, 1918.
2 SHEETS—SHEET 2.
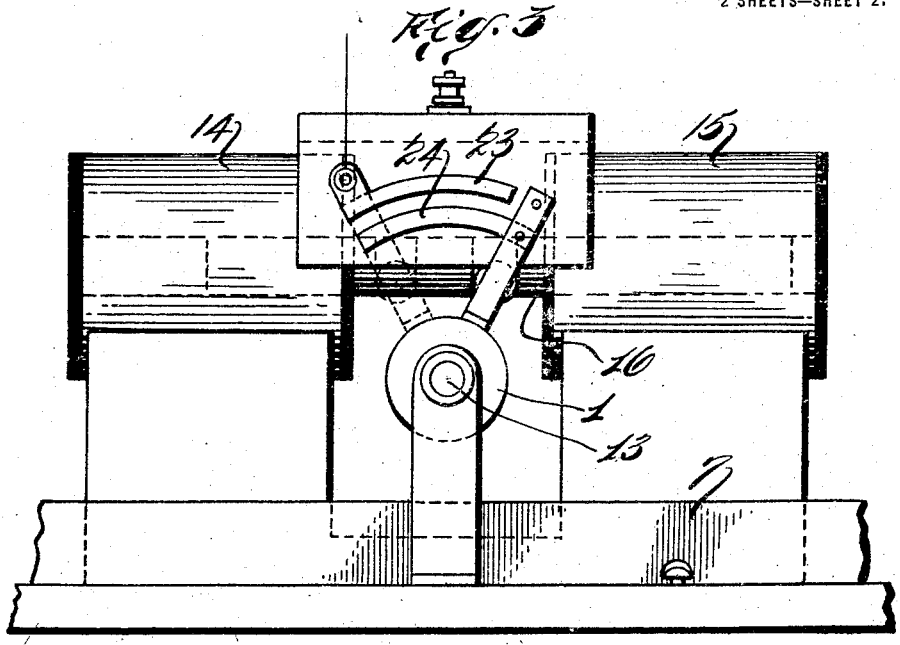
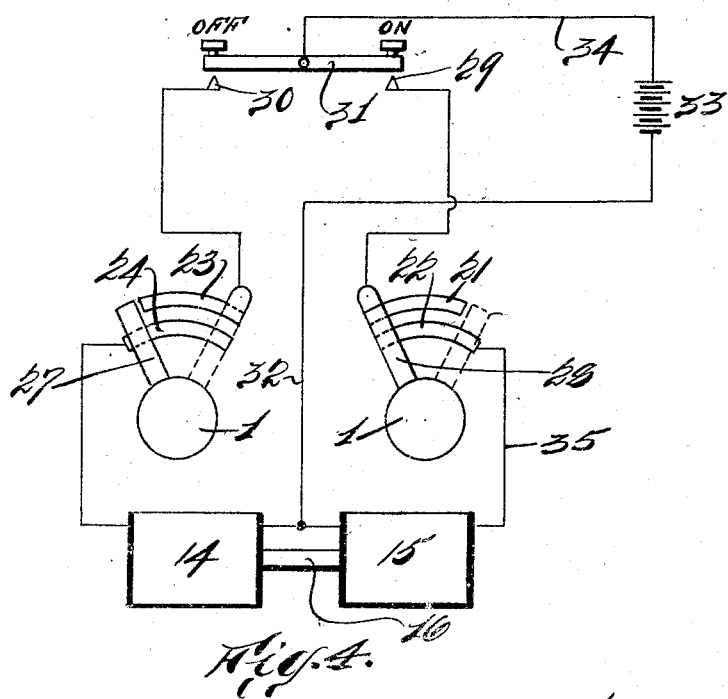
Witnesses
C. A. Jarvis.
Mabel Dittenhoefer
Inventor
Hubert F. Krantz.
by Warren Wright
attorney.

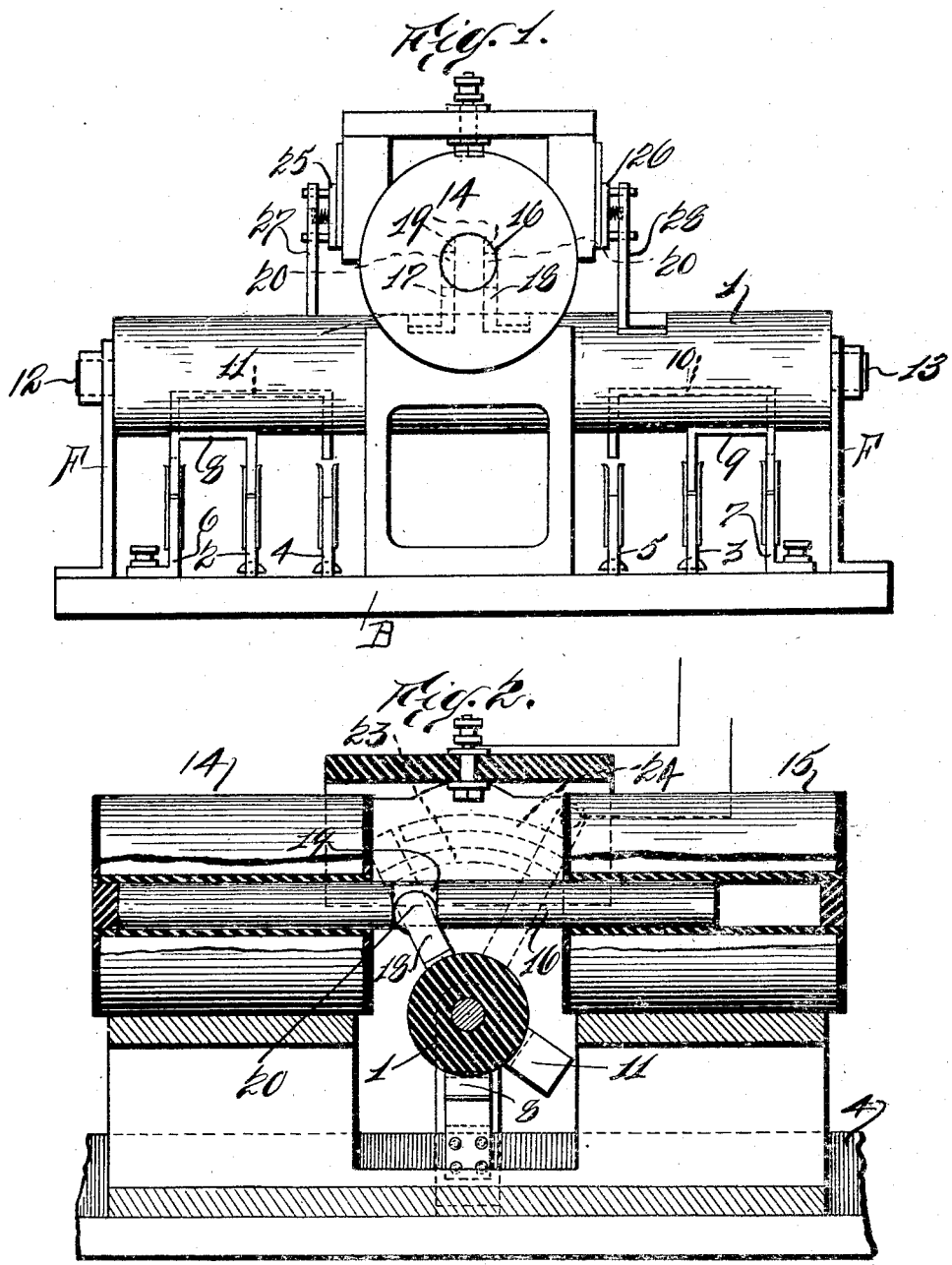

UNITED STATES PATENT OFFICE.

HUBERT F. KRANTZ, OF BROOKLYN, NEW YORK, ASSIGNOR TO KRANTZ MANUFACTURING COMPANY, INC., OF BROOKLYN, NEW YORK, A CORPORATION OF NEW YORK.

ELECTRICAL SWITCH.

1,275,047.

Specification of Letters Patent.

Patented Aug. 6, 1918.

Application filed December 2, 1913. Serial No. 804,167.

*To all whom it may concern:*

Be it known that I, HUBERT F. KRANTZ, a citizen of the United States, residing at Brooklyn, in the county of Kings, city and State of New York, have invented certain new and useful Improvements in Electrical Switches, of which the following is a clear, full, and exact description.

This invention relates to an electrical switch for solenoid operation which may be controlled from distant points by the energizing of the solenoids of the switch. The branch circuits which lead to the particular lighting circuit of the room connect directly with the switch adjacent to the switch, and such switch preferably has two sets of bus bars, one set normally receiving current from a source of supply, the other dead. The normal set is so arranged that when the switch is thrown to "on" position its blade will contact with the bus bar of one polarity with one leg of the branch circuit, and when thrown to "off" position, a second switch blade of the same switch will connect the same branch circuit terminal with the inert or dead or emergency bus bar. In this way, when the lights in a room are turned off, by sending current through the emergency bus bars all lights will be lighted, and when no current is sent through the emergency bus bars the normal bus bars and branch circuits will be under control, as in an ordinary installation. But always, the branch circuit will be in contact with one bus.

A still further object of the invention is to so construct the switch which makes its contacts with the bus bars and branch circuit terminals that at the extreme throw of the switch that circuit which has supplied current to the solenoid to effect that throw will become dead, broken by the switch itself, while at the same time the opposite solenoid will have its circuit completed by the switch so that it will be alive to permit a return of the core of the solenoid. In this way once a switch is operated from a distant point no current can be produced except momentarily for operating purposes, and only for operating purposes.

The scope of my invention will be pointed out in the claims.

In the accompanying drawings:

Figure 1 is an end elevation of a switchboard.

Fig. 2 is a section on line 2—2, Fig. 1.

Fig. 3 is a side elevation of one of the switches of said switchboard.

Fig. 4 is a diagram of the solenoid circuits.

As shown in the drawings, the bus plate B has thereon branch circuit terminals 6 and 7, a pair of normal bus bars 2 and 3, a pair of emergency bus bars 4 and 5, all preferably secured to the board in edgewise position. A suitable frame F carries a shaft 12 with an insulating barrel 1 thereon. On each side of the center of the board are provided two such contacts, in the shape of an inverted U, 8 and 11 on one side of the center, 9 and 10 on the other side. These switch contacts are so arranged that only one of the two will contact with the branch circuit terminal at one time, the other end of which will alternate with a bus bar, either the normal bus bar or the emergency bus bar.

The switch blades 11 and 10 duly contact with the emergency bus bar, the switch blades 8 and 9 only with the normal bus bar. An operating lever 18 carrying a roller 20 at one end fits in a recess 19 of the solenoid core 16, while the solenoids 14 and 15 are provided for reciprocating the core each side of the drum. On an insulated portion of the frame of the solenoid I provide switches particularly as shown in Figs. 3 and 4, one having segments 23 and 24, 24 of which is always in contact with a lever 27, and oscillating with the drum, such lever contacting also with 23 at all times except when the solenoid is in the position of Fig. 2, while segment 22 always contacts with the switch blade 28, and contacts with 21 at all times, except when the solenoid has drawn its core to the extreme right, in Fig. 2. A battery 33 may serve current to the solenoids, as shown in the diagram, Fig. 4. On endeavoring to turn off the switch, the switch blade 31 would be depressed to make contact with 30, with segment 23, and then the circuit would be found to be broken between the left hand end of 23 and the lever 27 so that no current could flow. But on pressing the lever 31 to "on" position, current would be caused to flow to contact 29, to segment 21 by a switch blade 28, to segment 22, to magnet 15, to conductor 32, back to the battery, and the solenoid 15 would throw the core to the extreme right of Fig. 2, only the circuit itself was broken to render it inert at 29. At the same time, the circuit would be established between 23 and 24 by a turning of the main switch to "off" position.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. A circuit controlling device of the double pole type, comprising a rotatable shaft, means to rotate said shaft into two positions, positive and negative normal contacts, positive and negative emergency contacts, and positive and negative branch line contacts, all of said contacts being spaced from the shaft and being spaced apart along the length of the shaft, a pair of conductor elements carried by the shaft having parts operable when the shaft is rotated into one position to connect the positive and negative normal contacts with the positive and negative branch line contacts, respectively, and operable when the shaft is rotated into a second position to disconnect said contacts, and said conductor elements having other parts also carried by the shaft operable when the shaft is in said second position to connect the positive and negative emergency contacts with the positive and negative branch line contacts respectively, and operable when the shaft is in the first mentioned position to disconnect said last mentioned contacts.

2. A circuit controlling device of the double pole type comprising a rotatable shaft, positive and negative normal contacts, positive and negative emergency contacts, and positive and negative branch line contacts, all spaced from the shaft and spaced apart along the length of the shaft, a pair of said branch line contact and extending thereof conductor elements carried by the shaft having parts operable when the shaft is rotated into one position to connect the positive and negative normal contacts with the positive and negative branch line contacts, respectively, and operable when the shaft is rotated into a second position to disconnect said contacts, said conductor elements having other parts also carried by the shaft operable when the shaft is in said second mentioned position to connect the positive and negative emergency contacts with said positive and negative branch line contacts, respectively, and operable when the shaft is in the first position to disconnect said last mentioned contacts, and electrically operable means to rotate said shaft including means providing a pair of opposingly connected circuits and selectively operable switches therefor, and means to automatically break each of said circuits at the completion, respectively, of its operative performance.

3. A circuit controlling device of the double pole type comprising a rotatable shaft, positive and negative normal contacts, positive and negative emergency contacts, and positive and negative branch line contacts, all spaced from the shaft and spaced apart along the length of the shaft, a pair of conductor elements carried by the shaft having parts operable when the shaft is rotated into one position to connect to positive and negative normal contacts with the positive and negative branch line contacts, respectively, and operable when the shaft is rotated into a second position to disconnect said contacts, said conductor elements having other parts also carried by the shaft operable when the shaft is in said second mentioned position to connect the positive and negative emergency contacts with said positive and negative branch line contacts, respectively, and operable when the shaft is in the first position to disconnect said last mentioned contacts, and electrically operable means to rotate said shaft including a pair of opposingly arranged electro-magnets connected with said shaft, selectively operable switches for energizing said magnets, and an automatic cut-out connected to be operated by said shaft for automatically de-energizing said magnets at the completion, respectively, of their operative performance.

4. A switch board comprising a base board, a normal supply bus-bar and an emergency supply bus-bar extending side by side along one surface of the base board, and a branch line contact arranged at the same surface of the base board, a shaft rotatably supported by the base board at the same surface thereof, being arranged outwardly from across and transversely across said bus-bars, means to rotate the shaft into two positions, and conductor means carried by said shaft to rotate therewith adapted selectively to connect said branch line contact with said normal or said emergency bus-bar according to the position into which the shaft is rotated.

Signed at New York city, in the county and State of New York this 21st day of November, one thousand nine hundred thirteen.

HUBERT F. KRANTZ.

Witnesses:
J. L. KOLLE,
GEO. W. ECKERSON.

It is hereby certified that in Letters Patent No. 1,275,047, granted August 6, 1918, upon the application of Hubert F. Krantz, of Brooklyn, New York, for an improvement in "Electrical Switches," errors appear in the printed specification requiring correction as follows: Page 2, strike out line 65; same page, after line 127, claim 4, insert the words *said branch line contact and extending there-;* and that the said Letters Patent should be read with these corrections therein that the same may conform to the record of the case in the Patent Office.

Signed and sealed this 22d day of October, A. D., 1918.

[SEAL.]
R. F. WHITEHEAD,
*Acting Commissioner of Patents.*

Cl. 175—281.